July 7, 1936.  G. M. ETNYRE  2,046,373
DISTRIBUTOR FOR ASPHALT AND LIKE MATERIALS
Filed April 13, 1933  2 Sheets-Sheet 1
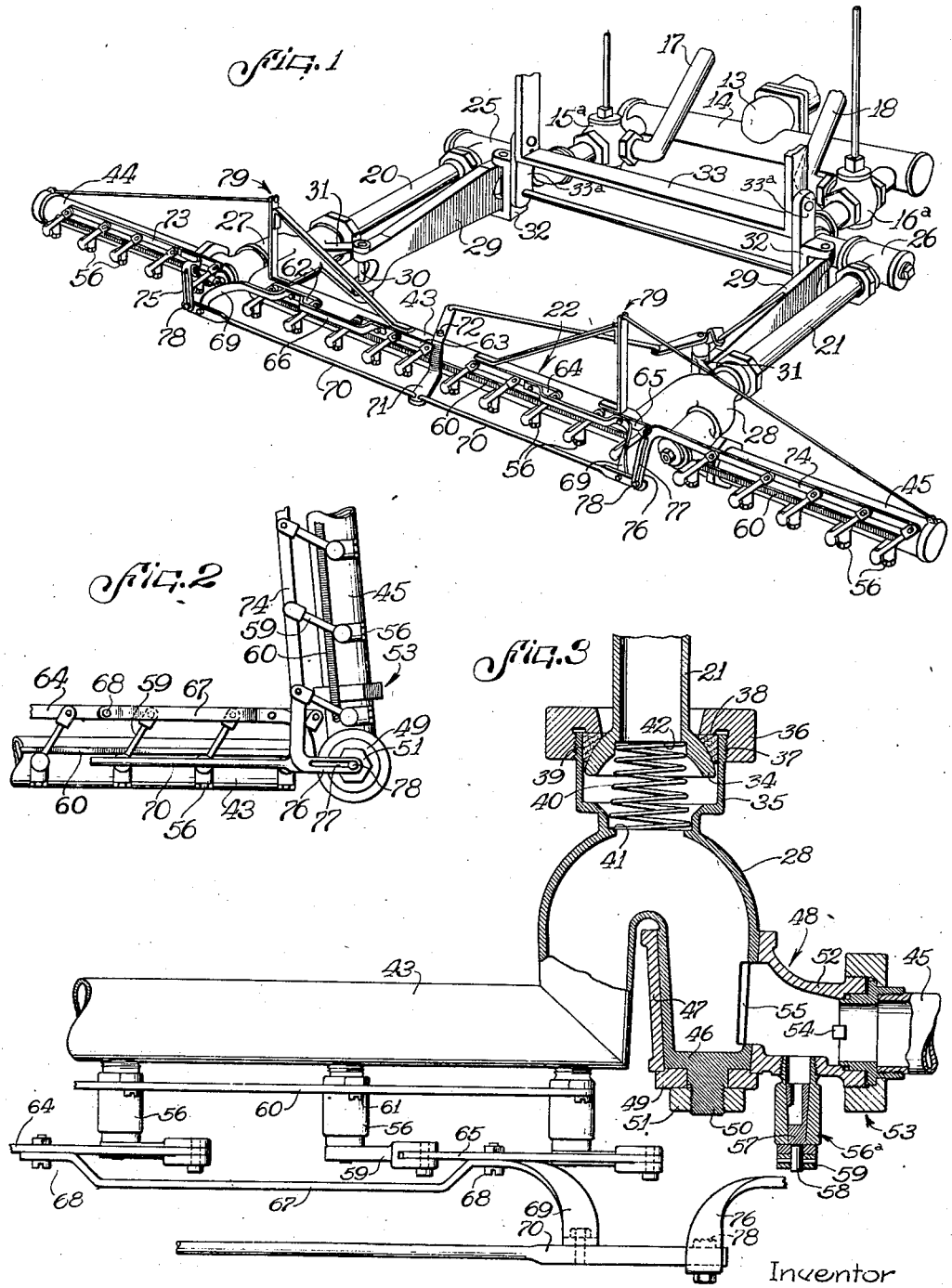
Inventor
George M. Etnyre
By Churchill, Parker & Carlson
Attorneys July 7, 1936.  G. M. ETNYRE  2,046,373
DISTRIBUTOR FOR ASPHALT AND LIKE MATERIALS
Filed April 13, 1933  2 Sheets—Sheet 2
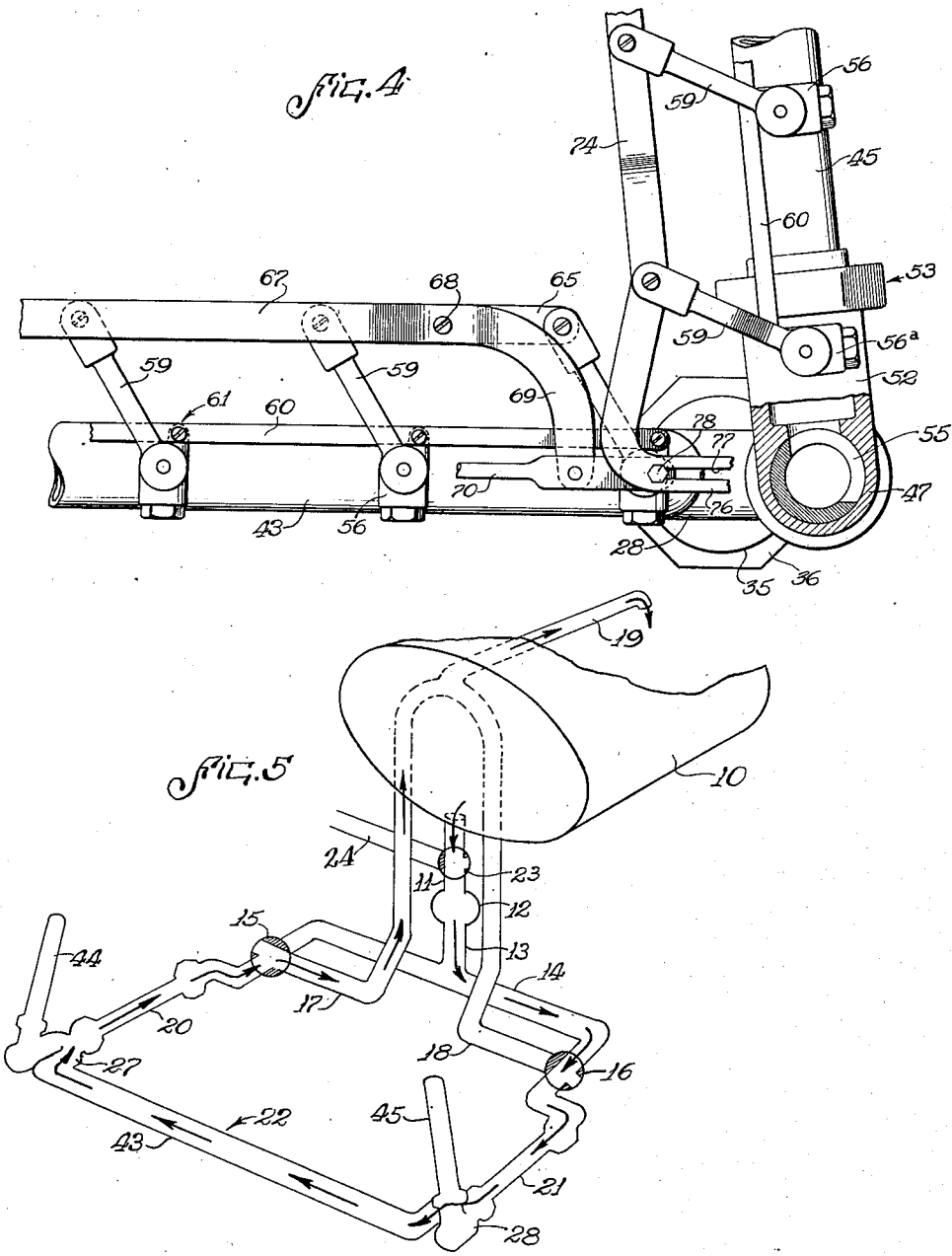

Patented July 7, 1936

2,046,373

UNITED STATES PATENT OFFICE 2,046,373

DISTRIBUTOR FOR ASPHALT AND LIKE MATERIALS

George M. Etnyre, Oregon, Ill., assignor to E. D. Etnyre & Company, Oregon, Ill., a corporation of Illinois Application April 13, 1933, Serial No. 665,859

14 Claims. (Cl. 299—34)

The invention relates generally to apparatus for applying liquid bituminous material, such as asphalt or the like, to roadways and more particularly to the material distributing system of such apparatus.

A general object is to provide, in apparatus of this character, a new and improved distributing system of high efficiency and of simple and practical construction.

Another object is to provide a distributing system which embodies a distributor bar of novel construction and arrangement of parts by which the system is quickly adaptable to meet all spraying requirements and conditions.

Another object is to provide a novel distributor bar in which end sections of the bar are connected in the system for movement to an out of the way position, said bar and sections having outlets controlled by valves which are manipulable only when the sections are properly located in a spraying position.

In conjunction with the foregoing, another object is to provide a valve operator arranged in sections corresponding to the distributor bar sections and so connected that when either or both end sections are swung out of spraying position the related operator section becomes inoperative.

A further object is to provide means for insuring closing of the valves on any swinging distributor bar section when the section is out of spraying position.

Further objects, more specifically stated, reside in the provision of a system of this character in which the discharge from the distributor bar is through valve controlled nozzles embodying means for definitely maintaining an alinement thereof; wherein the nozzles may be selectively grouped and controlled for operation to meet various spraying requirements; and in which parts of the system are connected in a novel manner for relative universal movement to permit of ready adjustment of the position of the distributor bar.

Other objects and advantages will become apparent in the following description and from the accompanying drawings, in which Figure 1 is a fragmentary view in perspective of a distributor embodying the features of the invention, the parts being shown in spraying position with the control valves closed.

Fig. 2 is a fragmentary elevational view of a detail of the distributor bar, one section thereof being in its inoperative, out of the way position.

Fig. 3 is a plan and partially sectional view on an enlarged scale of a detail of the distributor bar.

Fig. 4 is a view similar to Fig. 3 but showing the bar in side elevaton.

Fig. 5 is a diagrammatic view of the distributor system.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present invention is illustrated in connection with distributors for asphalt and like materials and the particular form herein shown in the drawings is embodied in a general machine organization substantially similar to that disclosed in my copending application for patent Serial No. 658,511, filed February 25, 1933. It will be apparent, however, that certain features of the invention may be readily adapted without substantial modification for distributors other than that disclosed in said application.

Generally the distributor organization embodies a supply tank 10 (Fig. 5) which is usually mounted upon a suitable truck (not shown). The asphalt or other material is drawn from one end of the supply tank through a conduit 11 which communicates with a pump 12 discharging through a conduit 13 into a header 14. Each end of the header communicates with three-way valves 15 and 16 mounted in valve casings 15ª and 16ª (Fig. 1). These valves control a flow through return pipes 17 and 18 leading to the tank 10, said pipes being in this instance connected within the tank with a common pipe 19 arranged to discharge at the end of the tank opposite that with which the conduit 11 communicates. The valves 15, 16 also control a flow through connector conduits 20, 21 which lead to a distributor bar 22. Interposed in the conduit 11 between the tank and the pump 12 is a three-way valve 23 provided for the purpose of directing a flow from the tank into the header 14, or during a filling operation, for establishing communication between an intake pipe 24 and the pump 12.

As described in my said copending application, proper manipulation of the valves 15, 16 and 23 produces any one of several conditions of circulation of material through the system. Thus, in the position of the valves illustrated in Fig. 5, a circulatory flow through the central part of the distributor bar is produced which is primarily used when the delivery of material from the system is momentarily interrupted. By merely changing the position of the valve 15 to establish communication between the connector conduit 20 and the header 14, the system is conditioned to distribute material, the flow then being from both ends of the header 14 through valves 15, 16, connector conduits 20, 21 to either end of the distributor bar 22, it being understood that as the valve 15 is manipulated, valves in the distributor bar nozzles are opened. If the valve 16 is turned counterclockwise through 90 degrees and the valve 15 through 180 degrees, the return pipes 17 and 18 are connected with the header 14 to feed material directly to the tank. For filling the tank, valves 15, 16 have this position and valve 23 is shifted to connect the intake pipe 24 with the pump 12. When the valves 15 and 16 are in the position shown in Fig. 5, but with the valve 23 turned to connect the intake pipe 24 with the pump 12, the intake pipe may be exposed to atmosphere or connected with a source of heated gas to cleanse the system, and in particular the distributor bar 22, of residual material.

The connector conduits 20, 21 are rigid tubular pipes which extend respectively between fittings 25, 26 communicating with the valve casings 15ª and 16ª and an intermediate portion of U-shaped members 27 and 28 which connect with the distributor bar 22 as will hereinafter be more particularly described.

The distributor bar 22 is supported in a horizontal position extending transversely of the machine frame by means which is preferably adjustable to shift the position of the distributor bar transversely or vertically in either direction. The means herein illustrated is substantially the same as that shown in said copending application and comprises arms 29 (Fig. 1) which are secured, through a vertical pivot 30, to brackets 31 on the U-shaped members 27, 28. The other ends of the bars 29 are pivotally supported on vertical axes by brackets 32 which, in turn, are pivotally supported for movement on a horizontal axis by a frame 33. Preferably supplemental brackets 33ª pivoted on horizontal axes are interposed between the brackets 32 and frame 33 to compensate for slight inaccuracies in the relative location of the pivotal centers of the supporting means and the universal joints by which connector conduits 20, 21 are included in the system. Any suitable means, such as that shown in my said copending application, may be employed for shifting the arms 29 either horizontally or vertically.

To permit of the aforesaid shifting movements of the distributor bar, the connector conduits 20, 21 are connected in the system by such means as universally movable or swivel joints preferably located at each end of said conduits 20 and 21. In illustration of a preferred type of joint, reference may be had to Fig. 3 wherein the connection between the conduit 21 and U-shaped member 28 is shown. Thus, the end of the conduit 21 flares outwardly to provide a head 34 having an arcuate outer surface. The head is receivable within a cylindrical flange 35 formed integrally with or as a part secured to the U-shaped member 28. A gland or nut 36 encircling the conduit 21 has screw-threaded engagement, as at 37, with the flange 35, said gland having a recess 38 in which a quantity of suitable packing material 39 is disposed for engagement with the outer arcuate surface of the head 34. A spring 40 is interposed between shoulders 41 and 42 on the U-shaped member 28 and conduit 21 respectively to exert a force normally holding the head 34 in close engagement with the packing material 39. A leak-proof seal may thus be obtained between conduits 20, 21 and the parts with which said conduits communicate, yet relative movement in any direction is permitted in the operation of adjusting the position of the distributor bar.

It should be noted that the connection of the conduit 21 with the U-shaped member 28, as well as of conduit 20 with the U-shaped member 27, is located at the bend of the U-shaped member so that the arms of said members are free thereby forming branch ducts for connection with separate sections of the distributor bar as will presently be described.

Now referring particularly to the construction of the distributor bar 22, said bar, in the present instance, is composed of three sections, i. e., an intermediate section 43 and end sections 44, 45 (see Fig. 1). The U-shaped members 27 and 28 are disposed with the branches thereof occupying substantially the same horizontal plane and the inner arms or branches of each are rigidly and permanently connected with an end of the intermediate section 43, as shown in Fig. 3. The outer arms of the U-shaped members support the end sections 44, 45 of the distributor bar for pivotal or swinging movement to an out of the way position, such movement and position in this embodiment being an upward swinging movement to a substantially vertical position as shown in Figs. 2 and 4. Suitable means for supporting the end sections for such movement is shown in Fig. 3 wherein the connection between the end section 45 and U-shaped member 28 is illustrated.

The outer arm of the member 28 has a transverse wall 46 closing the end of the arm and adjacent this wall the arm has a tapered outer surface forming a seat for a complementarily formed surface on a tubular portion 47 of a fitting 48. A washer 49 or the like encircling a stem 50, projecting outwardly from the transverse wall 46, is held in place by a nut 51 screw-threaded upon the stem, and the washer engages the end of the tubular portion 47 for holding the fitting 48 assembled upon the arm of the member 28 while permitting relative rotational movement between the parts.

The fitting 48 includes a nipple 52 which extends transversely from and communicates with the tubular portion 47. The end section 45 is secured to the nipple 52 by a suitable connection, generally indicated at 53, which preferably includes such means as a key 54 for preventing relative rotation between the nipple 52 and section 45 once these parts have been properly assembled. The side wall of the U-shaped member 28 is apertured, as at 55, to communicate with the nipple 52 and, as shown in Fig. 4, the aperture is of substantial length in a circumferential direction so that the nipple and end section are in communication with the member 28 throughout the entire range of swinging movement from a horizontal to a vertical position.

Each distributor bar section is provided with a series of discharge or spray nozzles 56 which are valve-controlled and, in the present instance, extend outwardly from the distributor bar in a horizontal plane but, of course, are directed downwardly (see Fig. 4). The nozzles are spaced equidistantly apart and, if the spacing requires it, one of the nozzles may be mounted on the nipple 52 as indicated at 56ᵃ (Fig. 3). Within each nozzle is a rotary plug type valve 57 (Fig. 3) having an actuating stem 58 to which an actuator 59 is rigidly connected.

In order to maintain a proper alinement of the nozzles, an interconnection between the nozzles in each section is provided which herein comprises (see Figs. 3 and 4) an elongated rod 60 common to the nozzles in each section and rigidly secured to each nozzle, as at 61, thereby preventing independent rotation of any nozzle relative to its distributor bar section.

The valves are arranged for simultaneous actuation by a single manually controllable instrumentality and the connections between the several valves is such that the valves may be combined in groups to facilitate adaptation of the machine to meet different operating requirements. Moreover, the connections embody a novel arrangement whereby when either end section is movable to a vertical position, the nozzle controlling valves in that section are closed and the actuating means for the valves rendered inoperative.

Considering first the operating connections between the nozzle valves on the intermediate section 43, the actuators 59 are connected together in groups by links 62, 63, 64 and 65, each of the links being a means for simultaneously actuating the valves connected thereby. In the exemplary form herein illustrated, ten nozzle valves are mounted on the intermediate section 43. The links 63 and 64 connect the central six valves in two groups of three valves each and links 62 and 65 connect the end valves in groups of two. Links 66 and 67 respectively connect links 62 and 63 and 64 and 65, the links 66 and 67 having a detachable connection therewith as by bolts 68. The outer end of each link 66, 67 is turned rearwardly and downwardly, as at 69, for pivotal connection with operating rods 70 which, in turn, are connected with a common operator 71 (Fig. 1). The operator 71 is pivotally mounted intermediate its ends, as at 72, upon a central part of the distributor bar section 43 and is manually manipulable in accordance with certain movements of the valves 15 and 16 as is fully set forth in my said copending application. It will be apparent that this arrangement permits all of the valves in the intermediate section to be simultaneously manipulated when the links 62 and 63 are connected by the link 66 and links 64 and 65 are connected by link 67. Furthermore, by merely detaching one or more of the links 62, 63, 64 or 65 from the corresponding link 66 or 67, the valves in the intermediate section 43 may be grouped to deliver material in sprays of various widths.

The valve actuators 59 in the end sections 44 and 45 are connected by links 73, 74 (Fig. 1) respectively, which links at their inner ends terminate in outwardly and downwardly bent end sections 75, 76. Each end section has an elongated longitudinally extending slot 77 therein through which studs 78, carried by the ends of the actuator rods 70 extend. The relationship of parts is such that when the end sections 44, 45 are in their horizontal operative position, as shown in Fig. 1, and the end section nozzle valves are closed, the location of the studs 78 in the slots 77 is approximately on the pivotal axis about which the end sections swing. Furthermore, the links 73 and 74 are so formed that, when the end sections 44 and 45 are in their vertical out of the way positions, the slots 77 extend along the line of movement of the actuator rods 70, as shown in Figs. 2 and 4. Consequently, when the end sections are in a horizontal position, movement of the actuator 71 through actuator rods 70 and links 73, 74 opens or closes the end section nozzle valves. When the end sections are in a vertical position, the studs 78 may reciprocate throughout the length of the slots 77 without actuating the links 73, 74. The two extreme relationships of the studs and slots are shown in Figs. 2 and 4.

By locating the connection between the links 73, 74 and actuating rods 70 on the pivotal axis of the end sections 44, 45 when the end section nozzle valves are closed, it is assured that the end sections will not be swung upwardly while the nozzle valves therein are open, since the bent end portions 75, 76 of the links 73, 74 may be arranged to prevent upward swinging movement of the end sections when the nozzle valves therein are open.

Suitable means, such as the truss structure 79 (Fig. 1) is provided for supporting the end sections in a horizontal position.

From the foregoing, it will be evident that a new and improved distributor system has been provided which is simple in construction and yet readily permits the operation of the machine to be adapted for different kinds of work. If a narrow strip is to be covered, the links 66 and 67 are properly disconnected from the links 62, 63, 64 and 65 and the end sections 44 and 45 swung to a vertical position. Movement of the operator 71 accordingly will actuate only a relatively small number of nozzle control valves. Increasingly wider strips may be sprayed up to the entire width of the intermediate section 43 by establishing proper connection between the valve controlling links and the operator 71. If a wider strip is desired, one or the other or both of the end sections 44, 45 may be lowered to a horizontal position and the connection of the valve operating links 73, 74 with the operator 71 is automatically established. This connection is advantageous from a time saving standpoint, since the end sections will almost invariably be turned to the vertical position when the machine is traveling any considerable distance and the only manipulating act required of the operator to condition the machine for traveling or operation is that of raising or lowering the end sections.

Another advantage of the present construction is the permanent communication of the end sections with the distributor system through the branch conduits provided by the U-shaped members 27, 28. Additionally, when the end sections are in a vertical position and the distributor system is set for a circulatory flow, as shown in Fig. 5, there is a tendency for residual material in the end section to drain into the circulatory flow. Moreover, in the operation of cleansing the system of residual material (wherein the system is as shown in Fig. 5 except that the valve 23 is turned to place intake pipe 24 in communication with pump 12) the residual material in the end section will drain therefrom leaving said sections substantially clean. Hence, a possible clogging of the distributor bar by solidified material is minimized.

I claim as my invention:

1. A distributor of the character described comprising, in combination, a flow system including a horizontal distributor bar section, conduits connected with the opposite ends of said section producing a flow through said section from end to end in a circulatory flow or in the operation of cleansing the system of material, distributor bar end sections supported for pivotal movement from horizontal positions in substantial continuation of said first mentioned section to upright positions, said end sections being constantly in communication with the flow system to receive material for distribution when horizontal and to permit drainage of residual material into said flow system when upright.

2. In a distributor system, the combination of a flow system having a horizontal sectional distributor bar comprising a central section, end sections, and means for pivotally supporting said end sections for upward swinging movement out of a horizontal operative position into a vertical out-of-the-way position, a series of outlets in the distributor bar sections each having a valve in control thereof, an operator for each valve, actuating means connecting the valves in the respective end sections for conjoint operation, means including a manually manipulable actuator connecting all of the valves in the central section for conjoint operation, and pivotal connections between the manual actuator for the central section valves and the actuating means for the end section valves for effecting conjoint movement of all of the valves when the manual actuator is manipulated while the distributor bar sections are in the operative position thereof, said pivotal connections including a lost motion relationship effective when the end sections are in the out-of-the-way position thereof to allow actuation of said manual actuator to operate said central section valves without actuating said end section valves.

3. In a distributor system, the combination of a flow system including a distributor bar, spray nozzles on said bar each having a valve and valve operator in control thereof, means including a plurality of individual members for operatively connecting the operators into separate groups for conjoint operation of the operators in each group, and a common actuator separately engaging said members, certain of said members being arranged to be optionally disengaged from operative relation with said actuator for rendering some of said groups inoperative without affecting the operation of the remaining operators.

4. In a distributor system, the combination of a flow system including a distributor bar, spray nozzles on said bar each having a valve and valve operator in control thereof, a horizontally movable actuator bar, and means including a plurality of individual links for operatively connecting groups of said operators for simultaneous operation of the operators in each group and having operative engagement with said actuator bar, certain of said links being arranged to be optionally disengaged from operative relation with said actuator bar whereby only the groups of operators remaining controlled by links in operative engagement with said actuator bar will be operated by the latter.

5. In a distributor system, the combination of flow conduits including a header, a sectional distributor bar including end sections, spaced connector conduits extending from said header toward said distributor bar, an intermediate conduit between each of said connector conduits and said distributor bar and having universally movable joints with said connector conduits, said intermediate conduits having branches leading separately to said end section of said distributor bar and to the bar section next adjacent thereto, and means associated with said intermediate conduit members for moving the same about said universal joints and shifting said distributor bar.

6. In a distributor system, the combination of a flow system including a horizontal sectional distributor bar having a central section and end sections, means pivotally supporting the end sections of said bar for independent movement to an out of the way position, a series of outlets in the bar sections each having a valve in control thereof, valve actuators common to the valves in each section, a common operator for each of said actuators for effecting conjoint movement of all of the valves when said operator is actuated, said operator and the actuators for the end section valves having connections effective when the end sections are in the out of the way position to disengage and allow actuation of said operator to operate the valves of said central section without actuating the valves of said end sections.

7. In a distributor system, the combination of a flow system having a sectional distributor bar therein, means pivotally supporting the end sections of said bar for independent movement to an out of the way position, a series of outlets in the bar sections each having a valve in control thereof, valve actuators common to the valves in each section, and manually controlled means connected with and effective to operate the valve actuators for the section between said end sections, the valve actuators for the end sections having an operative connection with said manually controlled means effective only when said end sections are in a spraying position and automatically releasable when said end sections are moved to the out of the way position so that in the latter position the actuators of said section between the end sections are operable while the actuators of the end sections remain inoperative.

8. A distributor bar for apparatus of the character described, comprising, in combination, an elongated tubular member arranged for connection with a supporting frame and having at each end a generally U-shaped horizontal bend, and an end section of tubular form pivotally mounted for vertical movement on the free arm of each bend in constant communication therewith throughout the range of movement and having a normal operating position in substantial alinement with said elongated member, valve spray nozzles on said member and said end sections, and articulated means connected for jointly actuating all of said valves when said end section is in said operating position and for actuating only the valves on said member when said end sections are moved to vertical position.

9. In a distributor system the combination of a liquid flow system having a sectional distributor bar therein, a conduit in said system having branches leading to an end section and to the bar section next adjacent thereto, means for supporting said end section on its associated branch for pivotal movement relative thereto, valves in each of said sections for controlling the discharge of liquid therefrom, and means for closing the valves on said end section as an incident to movement of said end section out of alinement with said adjacent section while the valves of said adjacent section remain in operative condition.

10. In a distributor system, the combination of a flow system including a sectional distributor bar having a central section and end sections, means pivotally supporting the end sections of said bar for independent movement to an out of the way position, a series of outlets in the bar sections each having a valve in control thereof, valve actuators common to the valves in each section, a common operator for said actuators, and means providing connections effective only when said end sections are in a given operative position relative to said central section for connecting the actuators for the end sections to move conjointly with the operator for the central section, said connections permitting each of said end sections to be moved independently into an out of the way position without affecting the conjoint operation of the valve actuator of the other end section and said central section.

11. In a distributor system, a flow circuit including a liquid supply tank, a system of connected conduits communicating with said tank and having a horizontal sectional distributor bar including a central section and end sections, means for separately connecting said central and end sections in said circuit, said end sections being pivotally supported by said means for permitting movement of said sections from a horizontal to a vertical position and providing conduits communicating between said circuit and said end sections regardless of the relative position of the end sections, discharge valves in said end and central sections, means for opening said valves and for effecting a discharge flow from said circuit through said distributor bar and for closing said valves and effecting a circulating flow through said circuit and central section, said end sections being arranged for drainage of the liquid therein into said circulating system when in a vertical position.

12. In a distributor bar, the combination of an elongated tubular member, a plurality of spaced spray nozzles on said member, operating means for controlling the flow of material through said nozzles, and means rigidly connected between adjacent nozzles separate from said operating means for maintaining a fixed alinement of said nozzles.

13. In a distributor of the character described, a flow system including a supply tank for heated fluid material and means for distributing said material, comprising a permanently horizontal distributor bar section, conduits connected with the opposite ends of said section for conveying heated material thereto, distributor bar end sections supported for pivotal movement from horizontal positions in substantial continuation of said permanently horizontal section to substantially vertical positions, a plurality of discharge openings in each of said sections having valve means in control thereof and governing the flow of heated material from the sections, said end sections being in constant communication with said conduits to receive material for distribution when horizontal and to permit drainage of residual material into said conduits as well as to maintain the connected ends of the end sections in heated condition when vertical, and means for closing the valves of said end sections when in vertical position so as to prevent discharge of material therefrom while the valves of said permanently horizontal section are open for distributing material.

14. In a distributor system for asphalt and like material, the combination with means for moving the system over an area to be treated, of a distributor bar comprising a plurality of relatively movable sections, means for supporting one of said sections in a generally horizontal position and for supporting a movable section longitudinally alined with said one section and arranged to permit pivotal movement of said movable section into an angular relative position, said means including a member having branches in substantially U-shaped formation leading separately to said one section and to said movable section and adapted for delivering separate streams of material to be distributed to the respective sections, a conduit for conveying material to said member, a plurality of spaced spray discharge members in each of said sections maintained in substantially uniform alinement throughout the length of the bars by the alinement of said sections, and means for controlling a distributing flow of material from said discharge members, the alinement of said sections and said members permitting spray therefrom to be started or stopped on substantially a straight line.

GEORGE M. ETNYRE.